United States Patent
Suzuki et al.

(10) Patent No.: US 7,376,503 B2
(45) Date of Patent: May 20, 2008

(54) VEHICLE RUNNING CONTROL APPARATUS AND VEHICLE RUNNING CONTROL METHOD

(75) Inventors: Toshihiro Suzuki, Toyota (JP); Mitsuru Ohba, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 10/548,961

(22) PCT Filed: Oct. 25, 2004

(86) PCT No.: PCT/IB2004/003494

§ 371 (c)(1),
(2), (4) Date: Sep. 15, 2005

(87) PCT Pub. No.: WO2005/052600

PCT Pub. Date: Jun. 9, 2005

(65) Prior Publication Data

US 2006/0231310 A1    Oct. 19, 2006

(30) Foreign Application Priority Data

Nov. 20, 2003  (JP) ............................. 2003-391233

(51) Int. Cl.
    *G06F 7/70*    (2006.01)
(52) U.S. Cl. ........................ 701/70; 701/79; 701/84; 180/197
(58) Field of Classification Search ............ 701/70, 701/79, 84, 87, 88, 89, 197; 180/65.2, 445
See application file for complete search history.

(56) References Cited

U.S. PATENT DOCUMENTS

| 4,712,635 | A | 12/1987 | Sumiya et al. |
| 4,771,848 | A | 9/1988 | Namba et al. |
| 2002/0041167 | A1* | 4/2002 | Kitano et al. ................... 318/3 |
| 2004/0007419 | A1* | 1/2004 | Tokumoto et al. .......... 180/446 |
| 2004/0040758 | A1* | 3/2004 | Shimizu .................... 180/65.2 |

FOREIGN PATENT DOCUMENTS

| EP | 1 359 044 A2 | 11/2003 |
| GB | 2 357 147 A | 6/2001 |
| JP | 06-048202 A | 2/1994 |
| JP | 09-048254 A | 2/1997 |

\* cited by examiner

*Primary Examiner*—Gertrude Arthur Jeangla
(74) *Attorney, Agent, or Firm*—Kenyon & Kenyon LLP

(57) ABSTRACT

There is provided wheel speed detection means for detecting a wheel speed V based on a pulse signal corresponding to a rotational speed of a wheel, driving torque integration means calculates an integral value $T_{IN}dt$ of driving torque $T_{IN}$ generated by the engine, and running situation determination means determines a vehicle running situation based on an actual wheel speed V and the integral value $T_{IN}dt$ of the driving torque $T_{IN}$. That is, the running situation determination means appropriately determines the vehicle running situation by comparing the actual wheel speed V which varies according to the vehicle running situation, and the function $f(T_{IN}dt)$ even when the actual wheel speed is in the extremely low speed region. The function $f(T_{IN}dt)$ is the function of the integral value $T_{IN}dt$ of the driving torque $T_{IN}$, and is also the function of the estimated wheel speed $V_P$ that is estimated based on the integral value $T_{IN}dt$ of the driving torque $T_{IN}$.

12 Claims, 7 Drawing Sheets

VEHICLE RUNNING CONTROL APPARATUS AND VEHICLE RUNNING CONTROL METHOD

INCORPORATION BY REFERENCE

This is a 371 national phase application of PCT/IB04/03494 filed 25 Oct. 2004, claiming priority to Japanese Patent Application No. 2003-391233 filed 20 Nov. 2003, the contents of which are incorporated herein by reference.

BACKGROUND OF THE INVENTION

1. Field of the Invention

The invention relates to a vehicle running control apparatus and method which includes wheel speed detection means for detecting a wheel speed based on a pulse signal corresponding to a rotational speed of a wheel, and which controls a vehicle running state according to a vehicle running situation that is determined based on the wheel speed, and a technology for determining the vehicle running situation.

2. Description of the Related Art

A vehicle is known, in which a vehicle running situation is determined using, for example, an acceleration of a wheel that is calculated from a wheel speed based on a pulse signal corresponding to a rotational speed of the wheel. In the vehicle, it is possible to determine that the vehicle is running on a rough road having a high running resistance as compared to a normal flat paved road, for example, the vehicle is running on a sand road, or that the vehicle is running while towing something. An example of the vehicle is disclosed in Japanese Patent Laid-Open Publication No. 6-48202 (JP-A-6-48202) or Japanese patent Laid-Open Publication No. 9-48254 (JP-A-9-48254). The vehicle disclosed in the aforementioned publication includes a frictional engagement device for distributing driving torque generated by a driving force source to part of plural wheels, such as an electromagnetic clutch device or a hydraulic clutch device that is provided in series with a propeller shaft in order to select between a four-wheel-drive state and a two-wheel-drive state, or to control a ratio at which power is distributed to a front wheel and a rear wheel in the four-wheel-drive state. In the vehicle, the vehicle running situation is determined based on at least the acceleration of the wheel, and engagement force of the frictional engagement device is controlled according to the result of the determination, whereby the driving force is appropriately distributed to the front wheels and the rear wheels, and stable running through performance can be obtained.

It is considered that the acceleration of the wheel is generally obtained by differentiating the wheel speed. However, in the case where the wheel speed is detected based on the frequency of the pulse signal, the frequency may become equal to or lower than a certain reference, and the number of the pulse signals during a certain time may become zero in an extremely low speed region, for example, in a region where the wheel speed is approximately 3 km/h or lower. Therefore, the wheel speed may be detected as zero in the extremely low speed region. In this case, when the wheel speed reaches a predetermined wheel speed, the acceleration of the wheel that is a differential value of the wheel speed sharply increases. Thus, since the accuracy of determining the acceleration of the wheel is low, there is a possibility that the vehicle running situation cannot be appropriately determined. Also, there is a case where a determination on the vehicle running situation is prohibited in the extremely low speed region since the accuracy of determining the acceleration of the vehicle is low in the region. In this case, there is the following problem. While the vehicle is on a road having a high running resistance, it is desired to bring the vehicle into the four-wheel-drive state suitable for running on a road having a high running resistance, for example, in order to move out of a sand road when the wheels start moving, that is, when the vehicle speed is zero, or to run on the sand road. However, since the vehicle running situation is not appropriately determined in the extremely low speed region as described above, there is a possibility that the driving force is not distributed to the front wheels and the rear wheels as desired, and therefore stable running through performance cannot be obtained.

DISCLOSURE OF THE INVENTION

It is an object of the invention to provide a vehicle running control apparatus and method, which includes wheel speed detection means for detecting a wheel speed based on a pulse signal corresponding to a rotational speed of a wheel, and which appropriately determines a vehicle running situation even when the wheel speed is in an extremely low speed region.

According to a first aspect of the invention, a vehicle running control apparatus includes wheel speed detection means for detecting a wheel speed based on a pulse signal corresponding to a rotational speed of a wheel, and controls a vehicle running state according to the vehicle running situation that is determined based on the wheel speed. The running control apparatus includes (a) driving torque integration means for calculating an integral value of driving torque generated by a driving force source; and (b) running situation determination means for determining the vehicle running situation based on the wheel speed and the integral value of the driving torque.

According to the first aspect of the invention, the vehicle running control apparatus includes the wheel speed detection means for detecting the wheel speed based on the pulse signal corresponding to the rotational speed of the wheel, and controls the vehicle running state according to the vehicle running situation that is determined based on the wheel speed. The driving torque integration means calculates the integral value of the driving torque generated by the driving force source, and the running situation determination means determines the vehicle running situation based on the wheel speed and the integral value of the driving torque. That is, the running situation determination means appropriately determines the vehicle running situation even when an actual wheel speed is in the extremely low speed region, by comparing the actual wheel speed which varies depending on the vehicle running situation and which is detected by the wheel speed detection means, and a function of an estimated wheel speed that is estimated based on the integral value of the driving torque.

In the first aspect of the invention, the driving torque integration means may calculate the integral value of the driving torque based on a value of output required of the driving force source.

With this configuration, since the driving torque integration means calculates the integral value of the driving torque based on the value of output required of the driving force source, the integral value of the driving torque can be calculated easily. For example, the driving torque integration means calculates the integral value of the driving torque which is decided based on the value of required output as a controlled variable which is generally used for controlling the output of the engine that is the driving force source, such as a fuel injection amount, an intake air amount, or a throttle valve opening amount. Alternatively, the driving torque integration means calculates the integral value of the driving torque based on the integral value of the fuel injection amount, the intake air amount, the throttle value opening amount, or the like.

In the first aspect of the invention and the modified examples, the running situation determination means may determine the vehicle running situation based on an actual wheel speed and the integral value of the driving torque, according to a map stored in advance, which includes a border line for distinguishing between different vehicle running situations, and which uses the wheel speed and the integral value of the driving torque as parameters.

With this configuration, the vehicle running situation can be determined easily even when the wheel speed is in the extremely low speed region.

In the first aspect of the invention and the modified examples, the running situation determination means may determine the vehicle running situation when the integral value of the driving torque has reached a predetermined value.

With this configuration, even when the actual wheel speed is zero, the vehicle running situation is determined.

In this case, the vehicle running control apparatus may further include a frictional engagement device that controls a distribution ratio at which the driving torque is distributed to a front wheel and a rear wheel among plural wheels; and engagement force control means for controlling engagement force of the frictional engagement device according to a result of a determination on the vehicle running situation that is made by the running situation determination means. When the vehicle is running on a road surface having a relatively high running resistance, for example, when the vehicle is running on a sand road, the engagement force of the frictional engagement device is increased or is made maximum, whereby a difference between rotational speeds of frictional elements included in the frictional engagement device can be decreased as much as possible, and therefore heat generation can be suppressed. That is, when the vehicle is running on a rough road having a high running resistance, for example, when the vehicle is running on a sand road, occurrence of heat loss can be suitably prevented. Further, in the case where the vehicle takes off or runs on a road having a high running resistance, for example, in the case where the vehicle moves out of, or runs on a sand road, even when the actual wheel speed is in the extremely low speed region, for example, even when the wheel has not started moving, that is, even when the wheel speed is zero, the vehicle can be brought into the four-wheel-drive state suitable for running on a road having a high running resistance. Thus, the driving force can be appropriately distributed to the front wheels and the rear wheels, and stable running through performance can be obtained.

Also, the frictional engagement device may be a coupling for distributing the driving force, which is provided in series with a power transmission path extending from the driving force source to one of the front wheel and the rear wheel in a four-wheel-drive vehicle. With the configuration, it is possible to provide a drive train having low fuel consumption and excellent traction performance.

According to a second aspect of the invention, a vehicle running control method includes the steps of: detecting a wheel speed based on a pulse signal corresponding to a rotational speed of a wheel; calculating an integral value of driving torque generated by a driving force source; determining the vehicle running situation based on the wheel speed and the integral value of the driving torque; and controlling a vehicle running state according to the determined vehicle running situation.

DETAILED DESCRIPTION OF THE PREFERRED EMBODIMENTS

Hereinafter, an embodiment of the invention will be described with reference to the accompanying drawings.

Figure 1:
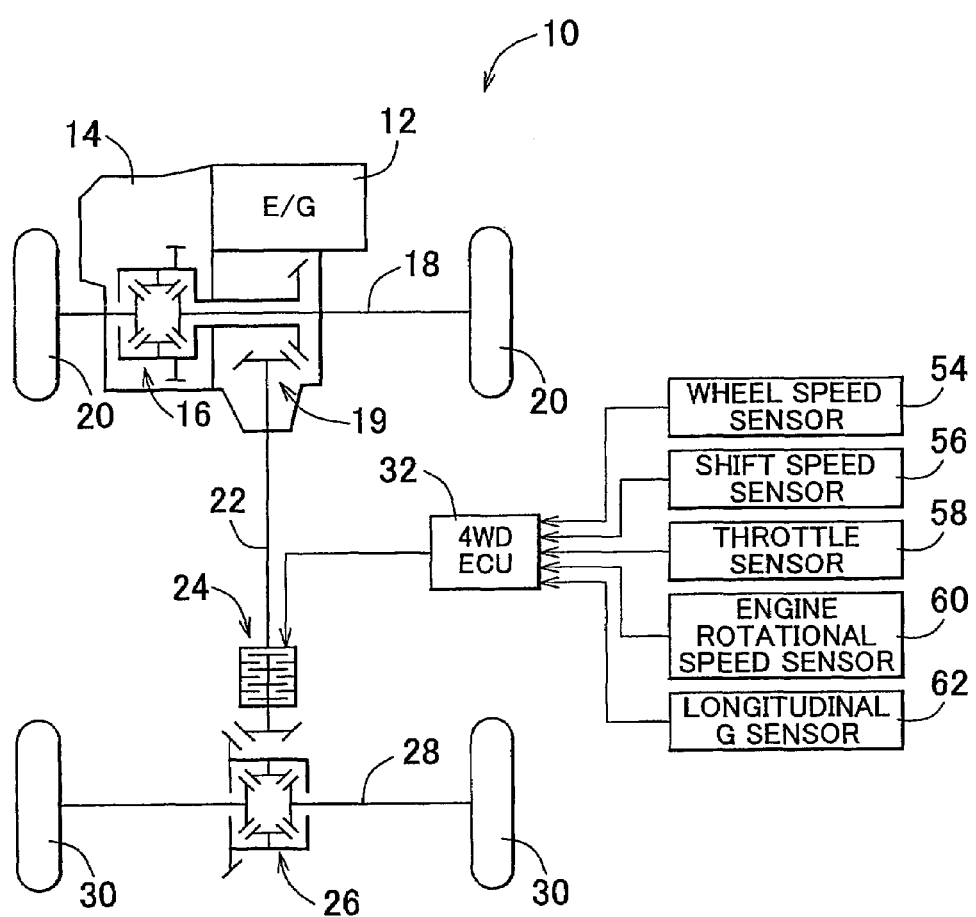
FIG. 1 is a schematic diagram showing a configuration of a front and rear wheel drive vehicle based on a front engine front wheel drive vehicle, which includes a driving force transmission device to which the invention is applied.

FIG. 1 is a schematic diagram showing a configuration of a driving force transmission device 10 of a front and rear wheel drive vehicle based on a front engine front wheel drive vehicle, to which the invention is applied. In FIG. 1, an engine 12 is an internal combustion engine such as a gasoline engine or a diesel engine. The engine 12 is a driving force source which generates driving force by burning fuel. The driving force generated by the engine 12 is transmitted to front wheels 20 which are main driving wheels via a transmission 14, a differential gear unit for front wheels 16, and a front wheel axle 18. Meanwhile, the driving force distributed from the transmission 14 via a transfer 19 is transmitted to rear wheels 30 which are sub-driving wheels via a propeller shaft 22, an electromagnetic coupling for distributing the driving force (hereinafter, referred to simply as "coupling") 24, a differential gear unit for rear wheels 26, and a rear wheel axle 28. The transfer 19 is a device for distributing the driving force to the front wheels and the rear wheels. The propeller shaft 22 is a shaft for transmitting the driving force. The coupling 24 is a frictional engagement device and is provided in series with the propeller shaft 22. Also, an electronic control unit 32 for controlling the coupling 24 is provided. That is, the driving force transmission device 10 shown in FIG. 1 is an example of a drive train of an electronically controlled torque split type four-wheel-drive, which distributes the torque generated by the engine 12 that is the driving force source according to the vehicle running situation. The coupling 24 makes it possible to provide the drive train having low fuel consumption and excellent traction performance.

The transmission 14 decreases or increases the speed of the rotation input thereto at a gear ratio y. For example, the transmission 14 is a synchromesh type manual transmission in which shift speed is changed by manual operation. That is, when a shift lever (not shown) is operated, at least one of plural synchromesh devices is selectively engaged or disengaged so that one of plural shift speeds such as five forward speeds, one reverse speed, and neutral is achieved. Thus, the shift speed is changed according to the gear ratio γ.

Figure 2:
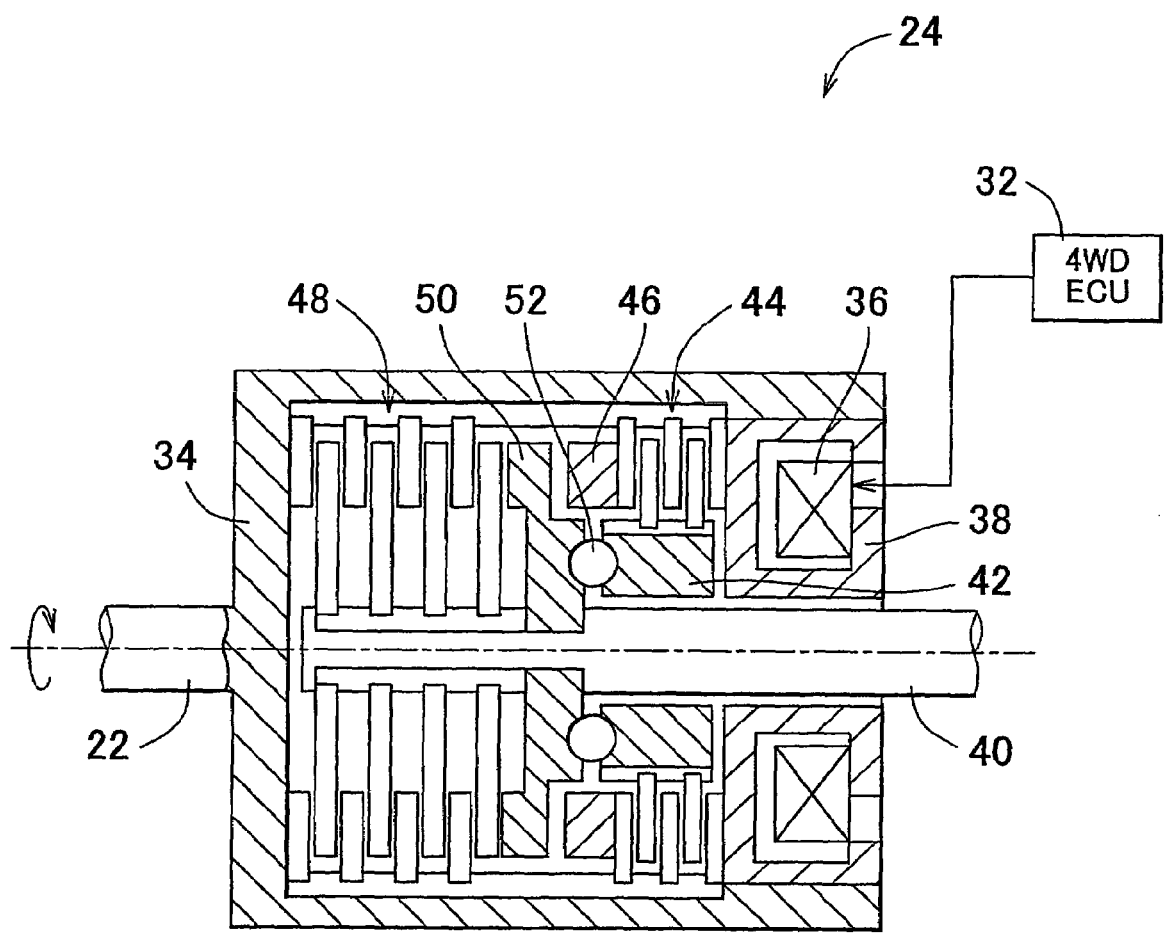
FIG. 2 is a schematic cross sectional view showing an example of a configuration of a coupling provided in the driving force transmission device shown in FIG. 1.

FIG. 2 is a schematic cross sectional view showing an example of the configuration of the coupling 24. As shown in FIG. 2, the coupling 24 includes a first housing 34, a second housing 38, an output shaft 40, a control cam 42, a control clutch 44, an armature 46, a main clutch 48, and a main cam 50. The first housing 34 is formed coaxially and integrally with the propeller shaft 22. The second housing 38 includes an electromagnetic solenoid 36, and is fixed on the inner peripheral side of first housing 34. The output shaft 40 is provided coaxially with the first housing 34, and is rotatable around the axis with respect to the first housing 34. The control cam 42 is provided coaxially with the output shaft 40, and is rotatable around the axis with respect to the output shaft 40. The control clutch 44 inhibits the rotation of the control cam 42 with respect to the first housing 34, or slips the control cam 42 with respect to the first housing 34. The armature 46 is an annular iron piece for pressing a clutch plate constituting the control clutch 44 toward the second housing 38. The armature 46 is provided coaxially with the output shaft 40, and is movable with respect to the output shaft 40 in the axial direction. The main clutch 48 inhibits the rotation of the output shaft 40 with respect to the first housing 34, or slips the output shaft 40 with respect to the first housing 34. The main cam 50 is provided coaxially with the output shaft 40 for pressing a clutch plate constituting the main clutch 48 toward the first housing 34. The main cam 50 is not rotatable around the axis with respect to the output shaft 40, and is movable with respect to the output shaft 40 in the axial direction. Plural concave portions are formed on a surface of the control cam 42, which are opposed to a surface of the main cam 50, and plural concave portions are formed on a surface of the main cam 50, which is opposed to a surface of the control cam 42. Plural balls 52 are provided between the control cam 42 and the main cam 50 such that the balls 52 are fitted into each concave portion.

In the coupling 24, when the electromagnetic solenoid 36 is non-energized, both of the control clutch 44 and the main clutch 48 are disengaged, and therefore the driving force of the propeller shaft 22 is not transmitted to the output shaft 40. Meanwhile, when the electromagnetic solenoid 36 is energized, magnetic flux is generated around the electromagnetic solenoid 36. Therefore, the armature 46 is attracted toward the second housing 38, and the control clutch 44 is engaged or slips according to control electric current supplied to the electromagnetic solenoid 36. When the rotational speed of the control cam 42 becomes different from that of the main cam 50 after the control clutch 44 is engaged, each of the balls 52 is pressed to the main cam 50 by an inclined plane of the concave portion in the control cam 42, and accordingly the main cam 50 is pressed toward the propeller shaft 22. As a result, the main clutch 48 is engaged, and the driving force of the propeller shaft 22 is transmitted to the output shaft 40.

The engagement force of the coupling 24, that is the engagement force of the main clutch 48 uniquely decides transmitted torque that is transmitted from the coupling 24. The engagement force is decided by the electric current supplied to the electromagnetic solenoid 36. That is, when the electric current supplied to the electromagnetic solenoid 36 is relatively small, the force for attracting the armature 46 toward the second housing 38 is relatively small, and the engagement force of the control clutch 44 is relatively small. Therefore, the difference in the rotational speed between the control cam 42 and the main cam 50 is small, and accordingly the force for pressing the main cam 50 toward the propeller shaft 22 is relatively small. As a result, the engagement force of the coupling 24 is relatively small. Meanwhile, when the electric current supplied to the electromagnetic solenoid 36 is relatively large, the force for attracting the armature 46 toward the second housing 38 is relatively large, and the engagement force of the control clutch 44 is relatively large. Therefore, the difference in the rotational speed between the control cam 42 and the main cam 50 is large, and accordingly the force for pressing the main cam 50 toward the propeller shaft 22 is relatively large. As a result, the engagement force of the coupling 24 is relatively large. When the electric current supplied to the electromagnetic solenoid 36 becomes equal to or larger than a predetermined value, the driving force is transmitted to the front wheels and the rear wheels such that the vehicle is brought into the substantially direct-coupled four-wheel-drive state. With the aforementioned configuration, a control is performed such that the ratio of the driving force distributed to the rear wheels 30 to all the driving force output from the transmission 14 is continuously changed in a range of 0 to 0.5.

Referring to FIG. 1 again, the vehicle includes a wheel speed sensor 54, a shift speed sensor 56, a throttle sensor 58, an intake air amount sensor (not shown), an engine rotational speed sensor 60, a longitudinal G sensor 62, and the like. The wheel speed sensor 54 detects a wheel speed V that is an actual rotational speed of the rear wheel 30 corresponding to the vehicle speed. The shift speed sensor 56 detects a shift speed $P_{SH}$ of the transmission 14. The throttle sensor 58 detects a throttle valve opening amount $\theta_{TH}$ of a throttle valve (not shown) corresponding to an accelerator opening amount Acc related to the value of required output. (the value of output required of the engine) that is the operation amount of an accelerator pedal (not shown) depressed according to the value of output required by a driver. The intake air amount sensor (not shown) detects an intake air amount $Q_{AIR}$ of the engine 12 corresponding to the throttle valve opening amount $\theta_{TH}$. The engine rotational speed sensor 60 detects an actual rotational speed of the engine 12. These sensors supplies a signal indicative of the wheel speed V, a signal indicative of the shift speed $P_{SH}$, a signal indicative of the throttle valve opening amount $\theta_{TH}$, a signal indicative of the intake air amount $Q_{AIR}$, a signal indicative of an engine rotational speed $N_E$, a signal indicative of longitudinal acceleration G, and the like to the electronic control unit 32.

For example, as the wheel speed sensor 54, an electromagnetic pickup sensor is suitably used. The electromagnetic pickup sensor 54 generates alternating voltage whose frequency changes according to the wheel speed V, and supplies the alternating voltage to the electronic control unit 32. The electronic control unit 32 converts the alternating voltage to the pulse signal. However, for example, the output of the electromagnetic pickup sensor may be converted to the pulse signal by a control circuit that is provided in a case together with the electromagnetic pickup sensor, and then, the pulse signal may be supplied to the electronic control unit 32. The wheel speed sensor 54 may be provided in one of the paired rear wheels 30. Also, the wheel speed sensors 54 may be provided in all of the wheels including the paired front wheels 20. In this case, four wheel speeds V are supplied to the electronic control unit 32. Therefore, for example, an average of the four wheel speeds V may be employed as the wheel speed of the vehicle, an average of the wheel speeds V of the paired rear wheels 30 may be employed as the wheel speed of the rear wheel 30 used for the control of distributing the driving force to the front wheels and the rear wheels, one of the four wheel speeds V may be employed as the wheel speed used for determining the vehicle running situation, and the lowest wheel speed may be employed as the wheel speed used for detecting locking of the wheel due to brake. Also, the wheel speed sensor 54 may be provided on the output shaft of the transmission 14 or on the propeller shaft 22 so as to detect an average of the wheel speeds of the front wheels 20, or the wheel speed sensor 54 may be provided on the output shaft 40 so as to detect an average of the wheel speeds of the rear wheels 30.

Also, for example, the electronic control unit 32 outputs a signal for driving a throttle actuator so as to change the throttle valve opening amount $\theta_{TH}$ according to the accelerator opening amount Acc, an injection signal for controlling an amount $F_{EFI}$ of fuel injected from the fuel injection valve, which corresponds to the intake air amount $Q_{AIR}$, and the like. The signal for driving the throttle actuator is not output in the case where the operation of the throttle valve is mechanically associated with the operation of the accelerator pedal, that is, a so-called link type is employed.

The electronic control unit 32 is configured to include a so-called microcomputer. The microcomputer includes a CPU, ROM, RAM, an input/output interface, and the like. The electronic control unit 32 performs signal processing according to a program that is stored in the ROM in advance using a temporary storage function of the RAM. For example, the electronic control unit 32 performs a control of the engagement force of the coupling 24 and the like, by controlling the electronic current supplied to the electromagnetic solenoid 36. Also, in order to control the output of the engine 12, the electronic control unit 32 controls opening/closing of the throttle valve using the throttle actuator (not shown), controls the fuel injection valve for controlling the fuel injection amount, and controls an ignition device such as an ignitor for controlling ignition timing. In order to control the throttle valve opening amount, the electronic control unit 32 drives the throttle actuator based on the actual accelerator opening amount Acc (%) according to a map stored in advance, which uses, as parameters, the accelerator opening amount Acc (%) corresponding to the operation amount of the accelerator pedal and the throttle valve opening amount $\theta_{TH}$. The electronic control unit 32 increases the throttle valve opening amount $\theta_{TH}$, as the accelerator opening amount Acc increases.

Figure 3:
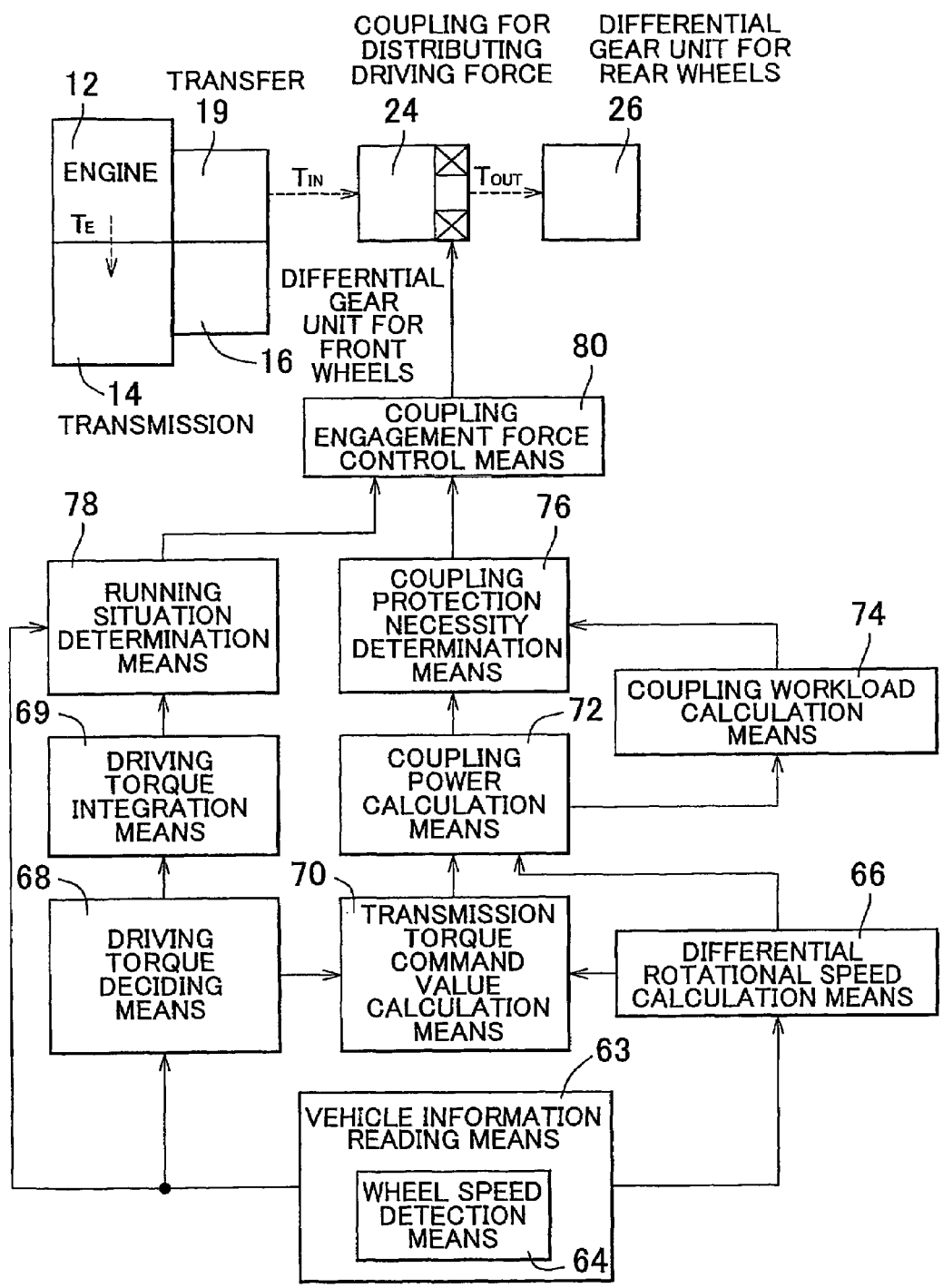
FIG. 3 is a functional block diagram showing a main portion of a coupling engagement force control function of an electric control unit provided in the driving force transmission device shown in FIG. 1.

FIG. 3 is a functional block diagram showing a main portion of a coupling engagement force control function for controlling the engagement force of the coupling 24, that is, a running control function for controlling the vehicle running state, which is performed by the electronic control unit 32 that serves as a running control apparatus. In FIG. 3, a dashed arrow indicates a main flow of engine torque output from the engine 12 to the driving wheels 20 or 30. Vehicle information reading means 63 in FIG. 3 reads present vehicle information from the sensors provided in the vehicle, and the like. For example, the vehicle information reading means 63 reads the shift speed $P_{SH}$, the throttle valve opening amount $\theta_{TH}$, the engine rotational speed $N_E$, the intake air amount $Q_{AIR}$, and the like from the shift speed sensor 56, the throttle sensor 58, the engine rotational speed sensor 60, the intake air amount sensor, and the like. Also, the vehicle information reading means 63 reads the present gear ratio y based on the present shift speed $P_{SH}$, according to a relation between the shift speed $P_{SH}$ and the gear ratio y that is stored in advance. Also, the vehicle information reading means 63 reads the fuel injection amount $F_{EFI}$ that is output from the electronic control unit 32 for controlling the output of the engine 12.

Figure 4:
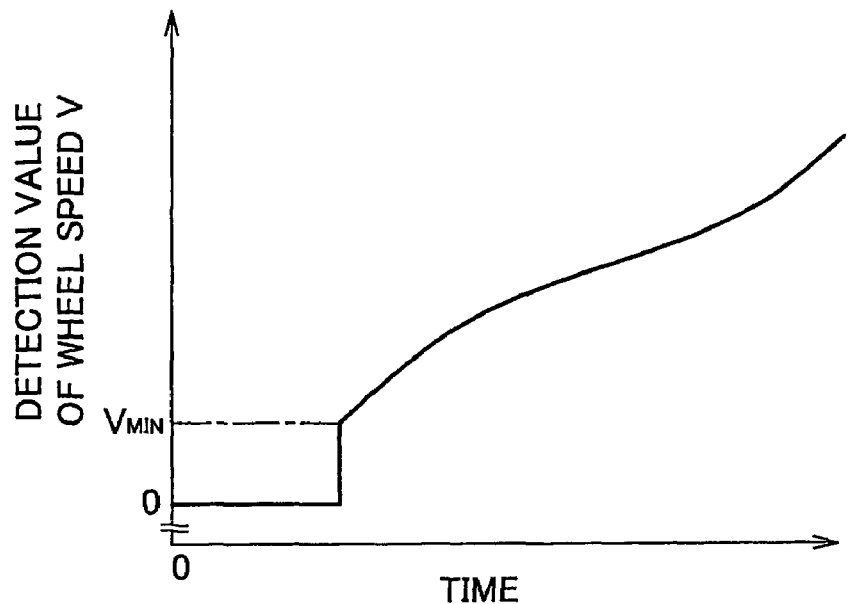
FIG. 4 is a graph showing detection of a wheel speed that is performed by the electronic control unit based on output of a wheel speed sensor shown in FIG. 1.

Further, the vehicle information reading means 63 includes wheel speed detection means 64, and reads the wheel speed V of the rear wheel 30 (hereinafter, unless otherwise specified, the wheel speed V indicates the wheel speed V of the rear wheel 30) from the wheel speed sensor 54. The wheel speed detection means 64 detects the wheel speed V based on the frequency of the pulse signal converted from the alternating voltage that is generated by the electromagnetic pickup sensor as the wheel speed sensor 54 according to the wheel speed V. That is, the wheel speed detection means 64 detects the wheel speed V based on the number of the pulse signals during a certain time. However, the frequency of the pulse signal may be equal to or lower than a certain reference, and the number of the pulse signals during the certain time may be zero in an extremely low speed region, for example, in a region where the wheel speed V is approximately 3 Km/h or lower. Therefore, the wheel speed detection means 64 detects the wheel speed V as zero in the extremely low speed region. FIG. 4 is a diagram showing detection of the wheel speed V. As apparent from FIG. 4, the detection value of the wheel speed V is zero in the region where the wheel speed V is lower than a wheel speed $V_{MIN}$, for example, in the region where the wheel speed V is lower than 3 Km/h. Accordingly, in the case where the vehicle running situation is determined based on the acceleration of the wheel that is a differential value of the wheel speed V, the acceleration of the wheel sharply increases when the detection value of the wheel speed V reaches the wheel speed $V_{MIN}$ in the region in which the value of the wheel speed V is lower than the wheel speed $V_{MIN}$. Therefore, when the wheel speed V is in the extremely low speed region, for example, when the wheel speed V is equal to approximately the wheel speed $V_{MIN}$, there is a possibility that the vehicle running situation cannot be appropriately determined since the accuracy of determining the acceleration is low. Also, there is a case where the determination on the vehicle running situation is prohibited in the extremely low speed region since the accuracy of determining the acceleration of the wheel is low.

Differential rotational speed calculation means 66 calculates a differential rotational speed $\Delta N$, which is a difference between an input rotational speed input and an output rotational speed output of the coupling 24. For example, the differential rotational speed calculation means 66 calculates the rotational speed of the propeller shaft 22 that is the input rotational speed, based on the engine rotational speed $N_E$ and the gear ratio γ that are read by the vehicle information reading means 63, or the wheel speed of the front wheel 20. Also, the differential rotational speed calculation means 66 calculates the rotational speed of the output shaft 40 that is the output rotational speed, based on the wheel speed V read by the vehicle information reading means 63. Then, the differential rotational speed calculation means 66 calculates the difference between the input rotational speed and the output rotational speed. The rotational speed of the propeller shaft 22 or the rotational speed of the output shaft 40 may be detected directly by a rotational speed sensor or the like.

Driving torque deciding means 68 decides driving torque $T_{IN}$ that is transmitted by the propeller shaft 22 and input to the coupling 24, based on engine torque $T_E$ generated by the engine 12. In the embodiment, since the gear ratio of the transfer 19 is set to 1.0, the driving torque $T_{IN}$ is equal to the output torque of the transmission 14. Therefore, the driving torque $T_{IN}$ is uniquely decided based on the engine torque $T_E$ and the present gear ratio γ of the transmission 14, according to an equation, $T_{IN}=T_E\times\gamma$. Thus, the driving torque deciding means 68 serves also as engine output torque deciding means. For example, the driving torque deciding means 68 decides the engine torque $T_E$ based on which the driving torque $T_{IN}$ is calculated, as an engine torque estimated value (theoretical value) $T_{EO}$, based on the actual engine rotational speed $N_E$, and the value of output required of the engine 12 (required load value) such as the throttle valve opening amount $\theta_{TH}$, which are read by the vehicle information reading means 63, according to a map shown in FIG. 5, which is stored in advance. Then, the driving torque deciding means 68 decides a theoretical value of the driving torque $T_{IN}$ transmitted by the propeller shaft 22, based on the engine torque estimated value (theoretical value) $T_{EO}$, and the present gear ratio γ read by the vehicle information reading means 63. Also, instead of the throttle valve opening amount $\theta_{TH}$, another value of output required of the engine 12 such as the accelerator pedal operation amount Acc, the intake air amount $Q_{AIR}$, the fuel injection amount $F_{EFI}$, or the like may be used.

The driving torque deciding means 68 may decide the engine torque $T_E$ as a value corresponding to the value of output required of the engine 12, based on the actual value of output required of the engine 12, according to a predefined relationship. In this case as well, an approximate value of the engine torque $T_E$ can be obtained. Also, only one of the actual values of required output, such as the throttle valve opening amount $\theta_{TH}$, the accelerator pedal operation amount Acc, the intake air amount $Q_{AIR}$, and the fuel injection amount $F_{EFI}$, may be used as a substitute value corresponding to the driving torque $T_{IN}$. Further, the driving torque deciding means 68 may directly detect the driving torque $T_{IN}$ using a torque sensor or the like. Also, the driving torque deciding means 68 may decide the driving torque $T_{IN}$ based on the engine torque $T_E$ which is directly detected by the torque sensor, and the present gear ratio γ.

Driving torque integration means 69 calculates the integral value of the driving torque $T_{IN}$ generated by the engine 12. For example, the driving torque integration means 69 calculates an integral value $\int T_{IN}dt$ of the driving torque $T_{IN}$ by integrating the driving torque $T_{IN}$ decided by the driving torque deciding means 68 from when the accelerator pedal is depressed, or calculates the integral value $\int T_{IN}dt$ based on an integral value $\int T_E dt$ of the engine torque $T_E$ that is obtained by integrating the engine torque $T_E$ decided by the driving torque deciding means 68 from when the accelerator pedal is depressed, and the present gear ratio γ, according to an equation, $\gamma\times\int T_E dt$. Also, the driving torque integration means 69 may calculate the integral value $\int T_{IN}dt$ of the driving torque $T_{IN}$, based on an integral value of the required output value such as $\int F_{EFI}dt$, and the present gear ratio γ. In this case as well, an approximate integral value of the driving torque $T_{IN}$ can be calculated.

Figure 6:
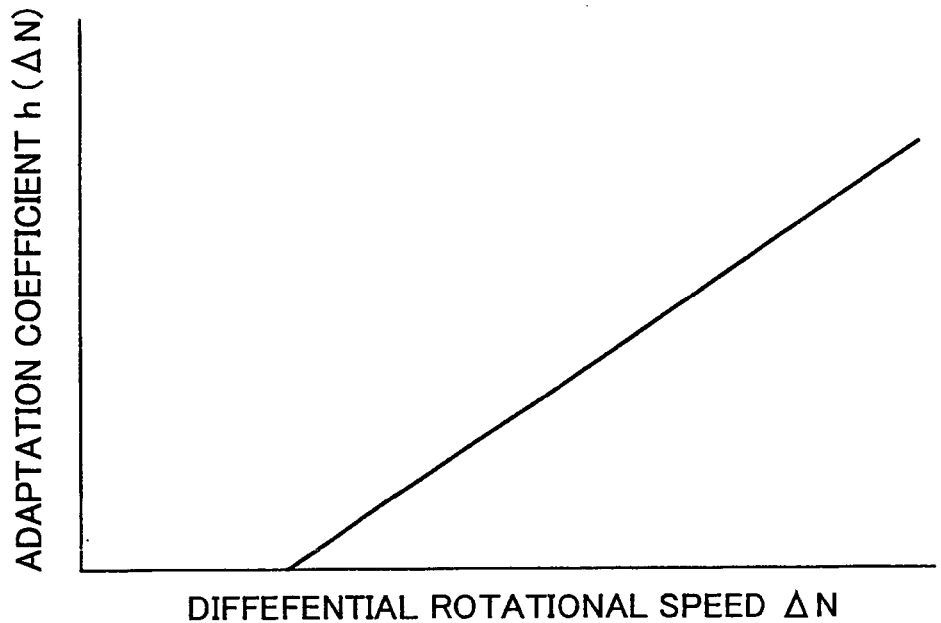
FIG. 6 is a diagram explaining an adaptation coefficient for increasing driving force distributed to rear wheels with an increase in a differential rotational speed of the coupling shown in FIG. 2.

Transmission torque command value calculation means 70 calculates a transmission torque command value $T_{OUT}$ for the coupling 24. For example, the transmission torque command value calculation means 70 calculates the transmission torque command value $T_{OUT}$ based on a torque distribution ratio KST, the differential rotational speed $\Delta N$ calculated by the differential rotational speed calculation means 66, and the driving torque $T_{IN}$ decided by the driving torque deciding means 68, according to a predefined relationship expressed by an equation (1) described below. In the normal control, the torque distribution ratio KST is set to approximately 0.2 so as to prevent the phenomenon of tight corner braking from occurring. Also, $h(\Delta N)$ in the equation (1) is a function showing zero when the differential rotational speed $\Delta N$ is less than a predetermined value, and showing a proportional relationship when the differential rotational speed $\Delta N$ is greater than the predetermined value, for example, as shown in FIG. 6. Thus, $h(\Delta N)$ is an adaptation coefficient for increasing the driving force distributed to the rear wheels 30 that are sub-driving wheels with an increase in the differential rotational speed $\Delta N$.

[Equation 1]

$$T_{OUT}=KST\times T_{IN}+h(\Delta N)\times T_{IN} \quad (1)$$

Coupling power calculation means 72 calculates power Q of the coupling 24 based on the differential rotational speed $\Delta N$ calculated by the differential rotational speed calculation means 66 and the driving torque $T_{IN}$ decided by the driving torque deciding means 68. For example, the coupling power calculation means 72 calculates the power Q of the coupling 24 as a product of the transmission torque command value $T_{OUT}$ calculated by the transmission torque command value calculation means 70 and the differential rotational speed $\Delta N$ of the coupling 24 calculated by the differential rotational speed calculation means 66.

Coupling workload calculation means 74 calculates a workload Qi that is an integral value of the power Q of the coupling 24 calculated by the coupling workload calculation means 72. The workload Qi corresponds to an amount of heat generated due to friction in the control clutch 44 or the main clutch 48 of the coupling 24. Therefore, the coupling workload calculation means 74 serves also as heat amount calculation means for calculating the amount of heat generated in the coupling 24.

Figure 7:
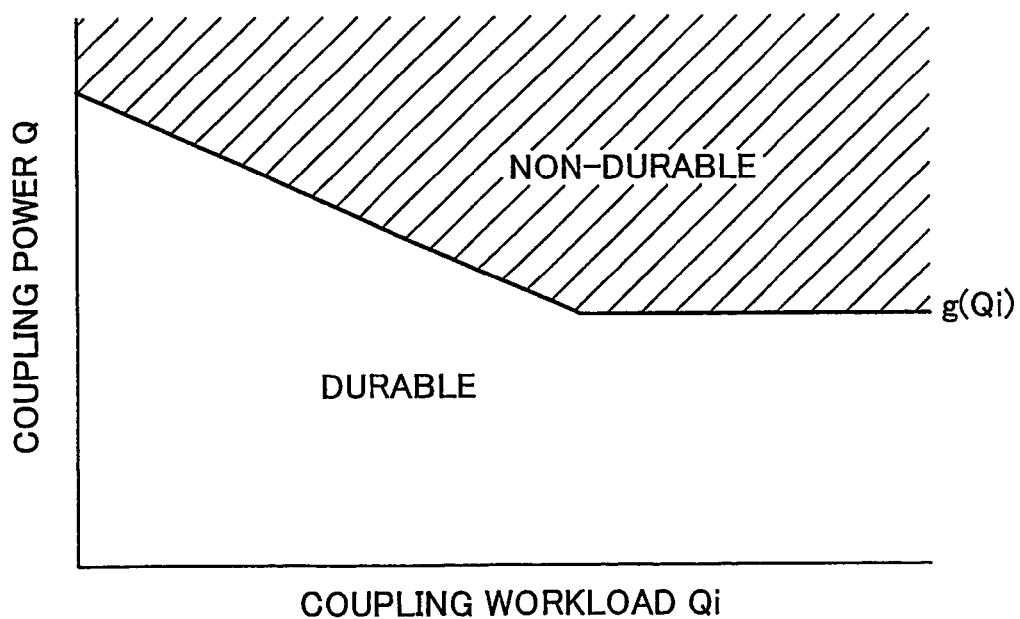
FIG. 7 is a diagram showing an example of a region where the coupling shown in FIG. 2 is durable and a region where the coupling is non-durable, based on a workload and power of the coupling.

Coupling protection necessity determination means 76 determines whether the coupling 24 needs to be protected by determining durability of the coupling 24 based on the power Q calculated by the coupling power calculation means 72 and the workload Qi calculated by the coupling workload calculation means 74, according to a relationship that is predefined as a region where the coupling 24 is durable and a region where the coupling 24 is non-durable based on the workload Qi and the power Q of the coupling 24. FIG. 7 is a diagram showing an example of a region where the coupling 24 is durable and a region where the coupling 24 is non-durable, based on the workload and power of the coupling 24. In FIG. 7, durability of the coupling 24 is not ensured in a hatched non-durable region where the power Q of the coupling 24 is equal to or greater than g (Qi) which is a function of the workload Qi. Meanwhile, the durability of the coupling 24 is ensured in a durable region other than the hatched region. Accordingly, the coupling protection necessity determination means 76 determines whether the durability of the coupling 24 is ensured, that is, whether the coupling 24 needs to be protected, by determining whether the power Q is equal to or greater than g (Qi).

Running situation determination means 78 determines the vehicle running situation based on the actual wheel speed V read by the vehicle information reading means 63, and the integral value $\int T_{IN} dt$ of the driving torque $T_{IN}$, according to a map stored in advance, which includes a border line for distinguishing between different vehicle running situations, and which uses the wheel speed V and the integral value $\int T_{IN} dt$ of the driving torque $T_{IN}$ as parameters. The vehicle running situation includes, for example, a situation in which the vehicle is normally running on a flat paved road (hereinafter, referred to as "flat road"), a situation in which the vehicle is running on a rough road having a high running resistance as compared to a flat road, for example, the vehicle is running on a sand road, a situation in which the vehicle is running while towing something, and a situation in which the vehicle is running on a low-mu road having a low running resistance as compared to a flat road, for example, the vehicle is running on a frozen road. The running resistance includes, for example, a rolling resistance of the wheel according to the state of the road surface on which the vehicle is running, and a grade resistance that is generated when the vehicle is running on a slope road.

Figure 8:
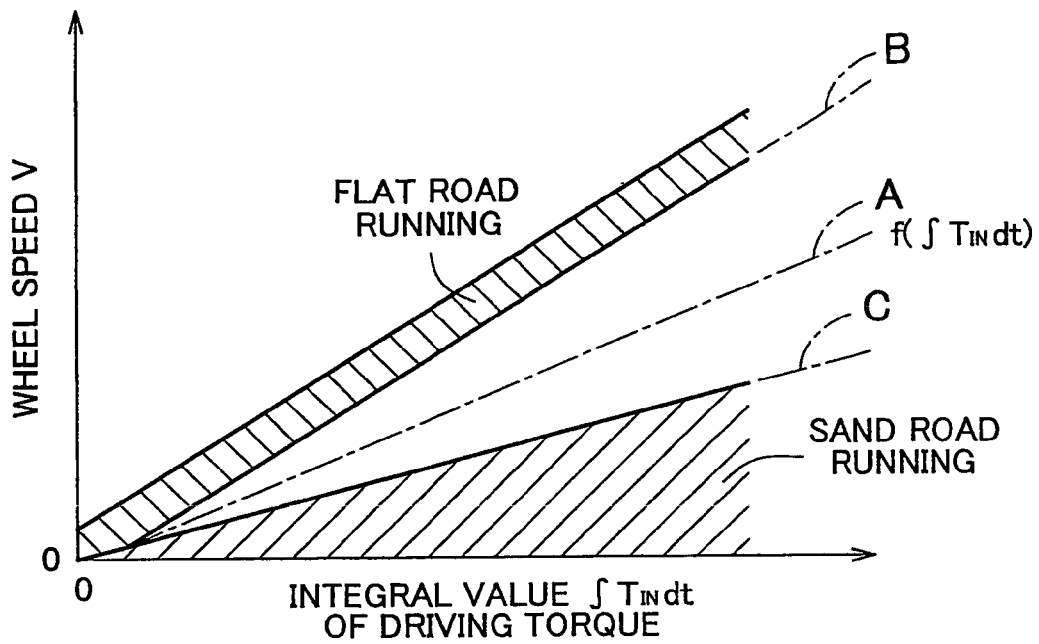
FIG. 8 is a diagram explaining vehicle running situations determined using an integral value of driving torque based on output of an engine, and a wheel speed.

FIG. 8 is a map stored in advance, which includes a border line for distinguishing between different vehicle running situations. The vehicle running situation is determined by the running situation determination means 78 based on the actual wheel speed V and the integral value $\int T_{IN} dt$ of the driving torque $T_{IN}$. In FIG. 8, for example, a region shown by downward-sloping lines (hereinafter, referred to as "flat road running region") corresponds to running on a flat road, and a region shown by upward-sloping lines (hereinafter, referred to as "sand road running region") corresponds to running on a road having a high running resistance such as running on a sand road. Accordingly, the running situation determination means 78 determines whether the vehicle is running on a road having a high running resistance, for example, the vehicle is running on a sand road, by determining whether the wheel speed V is equal to or lower than f ($\int T_{IN} dt$) that is a function of the integral value $\int T_{IN} dt$ of the driving torque $T_{IN}$, and serves as a border line for distinguishing between different vehicle running situations. The line indicating the function f ($\int T_{IN} dt$) may be between the flat road running region and the sand road running region, as shown by a line A in FIG. 8. Alternatively, the line indicating the function f ($\int T_{IN} dt$) may be a border line of the flat road running region on the sand road running region side as shown by a line B, or a border line of the sand road running region on the flat road running region side. That is, the line indicating the function f ($\int T_{IN} dt$) may be an inclined line between the line B and the line C such that the flat road running region and the sand road running region can be distinguished from each other. When the inclination of the line indicating the function f ($\int T_{IN} dt$) is larger, it is more likely to be determined that the vehicle is running on a sand road. Meanwhile, when the inclination is smaller, it is less likely to be determined that the vehicle is running on a sand road. Accordingly, the function f ($\int T_{IN} dt$) is appropriately set according to a desired likelihood of determining that the vehicle is running on a sand road, considering performance (characteristics) of the vehicle. Also, the line indicating the function f ($\int T_{IN} dt$) shown in FIG. 8, that is, the line for distinguishing between the flat road running region and the sand road running region does not need to be actually drawn, and may be stored as continuation of points indicating the wheel speed V corresponding to the integral value $\int T_{IN} dt$ of the driving torque $T_{IN}$.

Hereinafter, FIG. 8 will be described in more detail. When the vehicle is running on a road having a high running resistance, for example, when the vehicle is running on a sand road, the wheel speed V is low with respect to the generated driving torque $T_{IN}$, that is, the integral value $\int T_{IN} dt$ of the driving torque $T_{IN}$, as compared to when the vehicle is running on a flat road. Accordingly, the actual wheel speed V is substantially equal to an estimated wheel speed $V_P$ which is estimated based on the integral value $\int T_{IN} dt$ of the driving torque $T_{IN}$, for example, when the vehicle is running on a flat road. However, the actual wheel speed V is lower than the estimated wheel speed $V_P$ when the vehicle is running on a sand road. That is, it is apparent, from comparison between the estimated wheel speed $V_P$ and the actual wheel speed V, that the inclination is small when the vehicle is running on a road having a high running resistance, for example, when the vehicle is running on a sand road, as compared to when the vehicle is running on a flat road. Considering this, the distinction between different vehicle running situations is made in FIG. 8. That is, the running situation determination means 78 appropriately determines the vehicle running situation by comparing the actual wheel speed V which varies according to the vehicle running situation, and the estimated wheel speed $V_P$ which is estimated based on the integral value $\int T_{IN} dt$ of the driving torque $T_{IN}$. Accordingly, the function f ($\int T_{IN} dt$) is set in the aforementioned manner, considering that the function f ($\int T_{IN} dt$) is also a function of the estimated wheel speed $V_P$, and the estimated wheel speed $V_P$ may become equal to the actual wheel speed V when the vehicle is running on a flat road. Also, a relationship expressed by an equation (2) described below roughly explains that the estimated wheel speed $V_P$ is estimated, that is, decided in advance, based on the integral value $\int T_{IN} dt$ of the driving torque $T_{IN}$. In the equation (2), G is an acceleration of the wheel speed, F is driving force, m is a load, T is driving torque, and r is a radius of a tire.

[Equation 2]

$$VP = \int G dt = \int (F/m) dt = \int (T/r \cdot m) dt \qquad (2)$$

Figure 9:
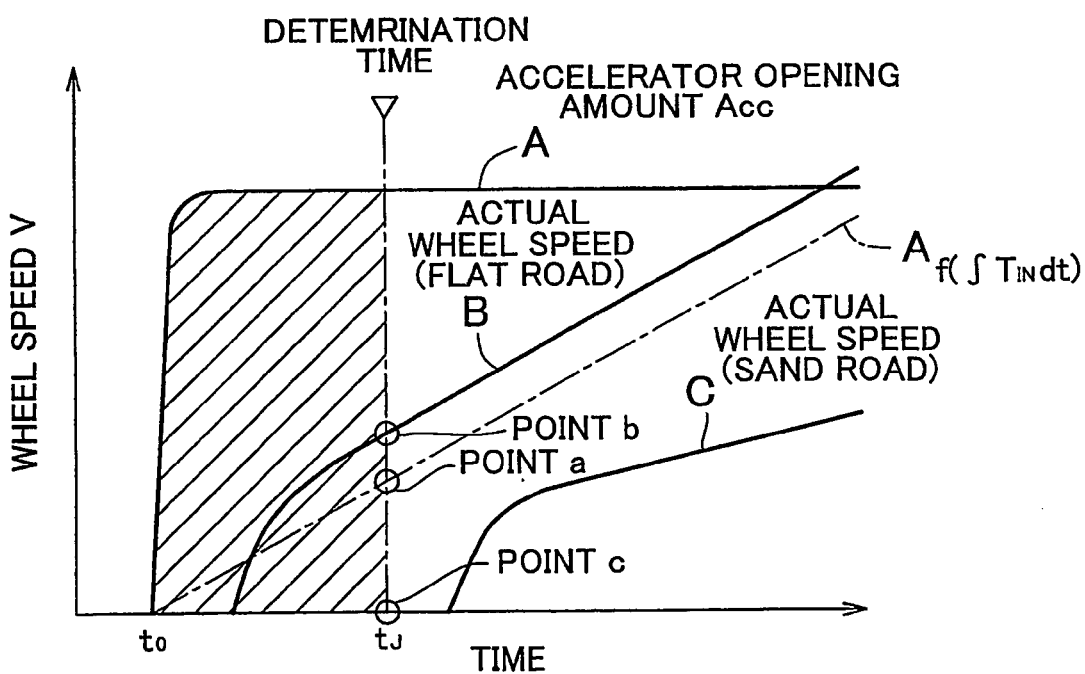
FIG. 9 is a diagram explaining that the electronic control unit provided in the driving force transmission device can determine that a vehicle is running on a road having a high running resistance, for example, the vehicle is running on a sand road even when the wheel speed is zero.

FIG. 9 is a diagram explaining that the running situation determination means 78 can determine that a vehicle is running on a road having a high running resistance, for example, the vehicle is running on a sand road even when the wheel speed is zero. In FIG. 9, a solid line A indicating the accelerator opening amount Acc also indicate, for reference, a tendency of the integral value $\int T_{IN} dt$ of the driving torque $T_{IN}$ which is calculated based on the accelerator opening amount Acc. In FIG. 9, a hatched region corresponds to the integral value $\int T_{IN} dt$ of the driving torque $T_{IN}$. However, an absolute value of the solid line A in the longitudinal direction does not match the wheel speed V. Also, a chain line A corresponds to the function f ($\int T_{IN} dt$) that is the function of the estimated wheel speed $V_P$ estimated based on the integral value $\int T_{IN} dt$ obtained by integrating the driving torque $T_{IN}$ from when the accelerator pedal is depressed (at time $t_o$). When the accelerator pedal is depressed (at time $t_o$), the value of the chain line A becomes equal to the value of the aforementioned hatched region. A solid line B indicates the wheel speed V when the vehicle is running on a flat road from when the accelerator pedal is depressed (at time $t_o$). A solid line C indicates the wheel speed V when the vehicle is running on a sand road from when the accelerator pedal is depressed (at time $t_o$). The running situation determination means 78 determines the vehicle running situation when the integral value $\int T_{IN} dt$ obtained by integrating the driving torque $T_{IN}$ from when the accelerator pedal is depressed (at time $t_o$) has reached a predetermined value, that is, when the estimated wheel speed $V_P$ estimated based on the integral value $\int T_{IN} dt$ obtained by integrating the driving torque $T_{IN}$ from when the accelerator pedal is depressed (at time $t_o$) has reached a predetermined wheel speed (at time $t_J$). For example, the running situation determination means 78 determines whether the vehicle is running on a sand road, by determining whether a wheel speed Vb shown by a point b or a wheel speed Vc shown by a point c is equal to or lower than a wheel speed Va shown by a point a. The wheel speed Vb or the wheel speed Vc is the actual wheel speed V when the estimated wheel speed $V_P$ has reached the predetermined wheel speed. The wheel speed Va is the wheel speed V estimated according to the function f ($\int T_{IN} dt$). Thus, even when the actual wheel speed V is zero as shown by the point c, it can be determined that the vehicle is running on a sand road. The predetermined wheel speed corresponding to the aforementioned predetermined value, which is used for deciding the time at which the determination is made (time $t_J$) shown in FIG. 9 is set in advance such that the running situation determination means 78 can reliably determine whether the vehicle is running on a sand road or a flat road. For example, the predetermined wheel speed is set to approximately 15 km/h. In other words, the predetermined wheel speed is set such that the running situation determination means 78 can determine that the vehicle is running on a sand road even when the wheel speed V is zero in the case where the vehicle is running on a sand road.

Coupling engagement force control means 80 controls the engagement force of the coupling 24 by controlling the electric current supplied to the electromagnetic solenoid 36 according to the transmission torque command value $T_{OUT}$. For example, when the coupling protection necessity determination means 76 determines that the durability of the coupling 24 is not ensured, that is, the coupling 24 needs to be protected, the coupling engagement force control means 80 changes the engagement force of the coupling 24 in order to protect the coupling 24. That is, when the coupling protection necessity determination means 76 determines that the power Q of the coupling 24 is equal to or greater than g (Qi) that is the function of the workload Qi, the coupling engagement control means 80 performs a coupling protection control for decreasing the engagement force of the coupling 24 or making the engagement force zero in order to protect the coupling 24.

Also, the coupling engagement force control means 80 changes the engagement force of the coupling 24 for appropriately controlling the vehicle running state, that is, distribution of the driving force to the front wheels and the rear wheels, based on a result of the determination as to whether the actual wheel speed V is equal to or lower than the function f ($\int T_{IN} dt$) that is the function of the integral value $\int T_{IN} dt$ of the driving torque $T_{IN}$. For example, when it is determined that the actual wheel speed V is higher than the function f ($\int T_{IN} dt$), the coupling engagement force control means 80 performs a normal control suitable for running on a flat road, by controlling the electric current supplied to the electromagnetic solenoid 36 according to the transmission torque command value $T_{OUT}$ calculated based on the torque distribution ratio KST of 0.2 using the equation (1) described above. Also, when it is determined that the actual wheel speed V is equal to or lower than the function f ($\int T_{IN} dt$), the coupling engagement force control means 80 performs a high running resistance road control (sand road running control) suitable for running on a road having a high running resistance, in order to increase the engagement force of the coupling 24 as compared to the normal control, or to make the engagement force maximum (limit), by controlling the electric current supplied to the electromagnetic solenoid 36 according to the transmission torque command value $T_{OUT}$ calculated based on the torque distribution ratio KST of 1.0 using the equation (1).

Figure 10:
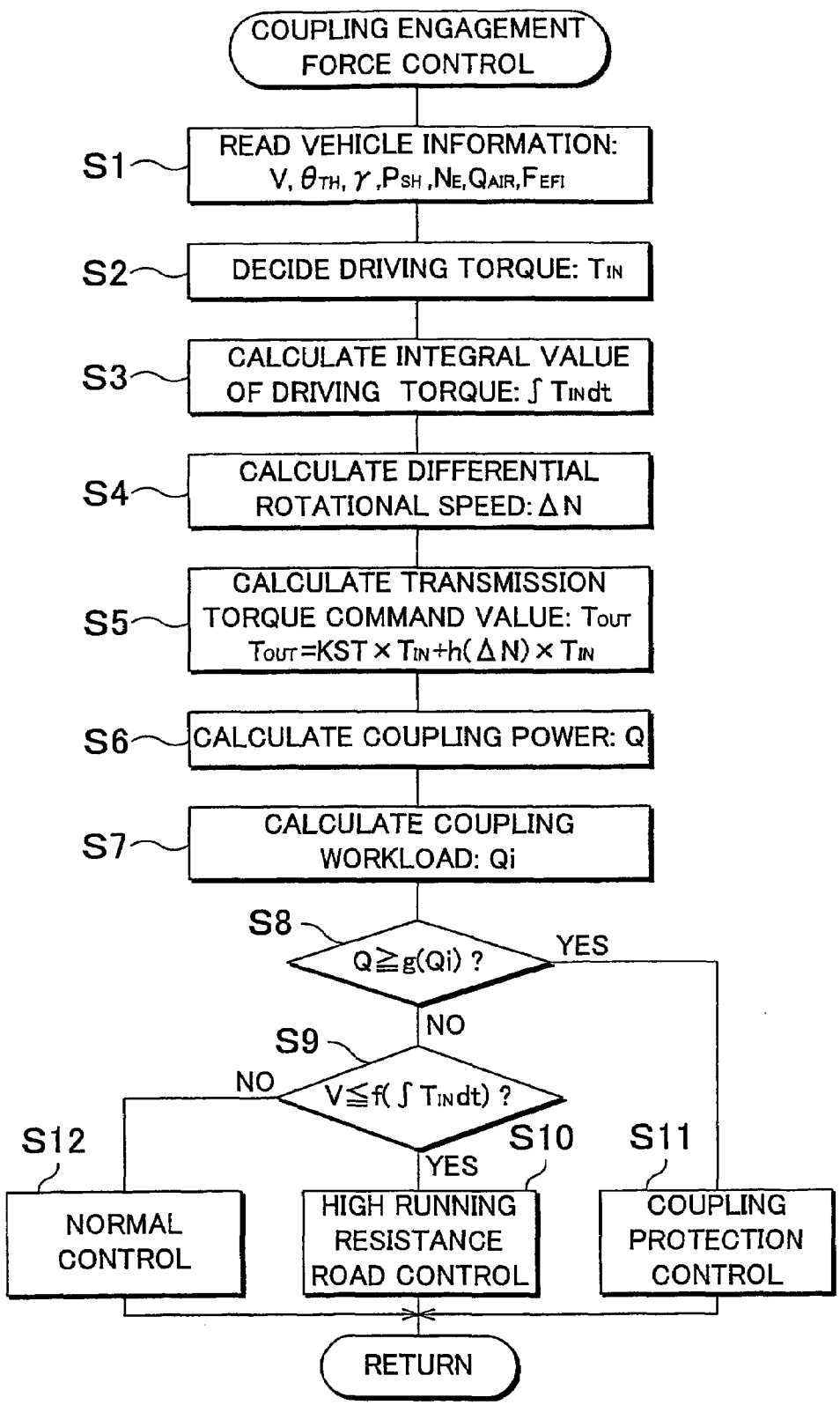
FIG. 10 is a flowchart explaining a main portion of a coupling engagement force control operation performed by the electronic control unit shown in FIG. 1.

FIG. 10 is a flowchart explaining a main portion of a coupling engagement force control operation performed by the electronic control unit shown in FIG. 1. The coupling engagement force control is repeatedly performed in an extremely short cycle, for example, a cycle of several microseconds to several tens of microseconds.

First, in a step S1 corresponding to the vehicle information reading means 63, the shift speed $P_{SH}$, the throttle valve opening amount 6, the engine rotational speed $N_E$, the wheel speed V, and the like are read from the shift speed sensor 56, the throttle sensor 58, the engine rotational speed sensor 60, the wheel speed sensor 54, and the like. Also, the present gear ratio γ is read based on the present shift speed $P_{SH}$, according to a relationship between the shift speed $P_{SH}$ and the gear ratio γ, which is stored in advance.

Figure 5:
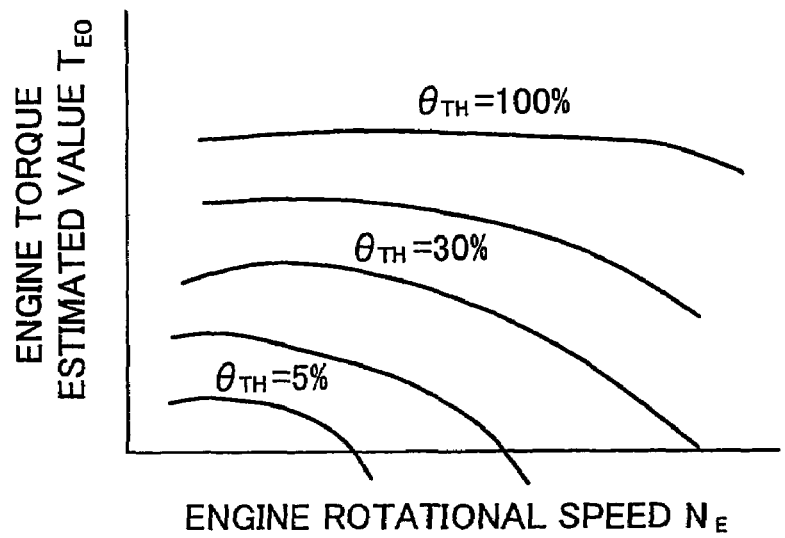
FIG. 5 is a map stored in advance, which is used for calculating engine torque, as an engine torque estimated value, based on a throttle valve opening amount and an engine rotational speed.

Next, in step S2 corresponding to the driving torque deciding means 68, the engine torque $T_E$ based on which the driving torque $T_{IN}$ is calculated is decided as an engine torque estimated value (theoretical value) $T_{EO}$, based on the actual throttle valve opening amount $\theta_{TH}$ and the actual engine rotational speed $N_E$ which are read in step S1, according to a map shown in FIG. 5, which is stored in advance. Then, the theoretical value of the driving torque $T_{IN}(=T_{EO} \times \gamma)$ transmitted by the propeller shaft 22 is decided based on the engine torque estimated value (theoretical value) $T_{EO}$, and the present gear ratio γ read in step S1. Next, in step S3 corresponding to the driving torque integration means 69, the integral value $\int T_{IN} dt$ of the driving torque $T_{IN}$ is calculated by integrating the driving torque $T_{IN}$ calculated in step S2 from when the accelerator pedal is depressed.

Next, in step S4 corresponding to the differential rotational speed calculation means 66, the rotational speed $N_{IN}$ of the propeller shaft 22 that is the input rotational speed is calculated based on the engine rotational speed $N_E$ and the gear ratio γ that are read in step S1. Also, the rotational speed $N_{OUT}$ of the output shaft 40 that is the output rotational speed is calculated based on the wheel speed V read in step 1, and the differential rotational speed ΔN that is the difference between the input rotational speed and the output rotational speed is calculated.

Next, in step S5 corresponding to the transmission torque command value calculation means 70, the transmission torque command value $T_{OUT}$ is calculated based on the torque distribution ratio KST, the driving torque $T_{IN}$ calculated in step S2, and the differential rotational speed ΔN calculated in step S4, according to the aforementioned equation (1). In the normal control suitable for running on a flat road, the torque distribution ratio KST is set to approximately 0.2 in order to prevent occurrence of tight corner braking phenomenon. Next, in step S6 corresponding to the coupling power calculation means 72, the power Q of the coupling 24 ($=T_{IN} \times \Delta N$) is calculated based on the driving torque $T_{IN}$ calculated in step S2 and the differential rotational speed ΔN calculated in step S4. Next, in step S7 corresponding to the coupling workload calculation means 74, the coupling workload Qi that is the integral value of the coupling power Q calculated in step S6 is calculated.

Next, in step S8 corresponding to the coupling protection necessity determination means 76, it is determined whether the power Q calculated in step S6 is equal to or greater than g (Qi) which is the function of the workload Qi calculated in step S7, for example, according to the region where the coupling 24 is durable and the region where the coupling 24 is non-durable shown in FIG. 7. When an affirmative determination is made in step S8, the coupling protection control for making the engagement force of the coupling 24 zero is performed in step S11, and then the routine is terminated. When a negative determination is made in step S8, it is determined whether the wheel speed V read in step S1 is equal to or lower than, for example, f ($\int T_{IN}dt$) shown in the map in FIG. 8 in order to determine whether the vehicle is running on a road having a high running resistance, for example, the vehicle is running on a sand road in step S9 corresponding to the running situation determination means 78. The function f ($\int T_{IN}dt$) is the function of $\int T_{IN}dt$ which is calculated by integrating the driving torque $T_{IN}$ from when the accelerator pedal is depressed in step S3. For example, this determination is made at the determination time (at time $T_J$) shown in FIG. 9 as described above, that is, when the estimated wheel speed $V_P$, which is estimated based on the integral value $\int T_{IN}dt$ calculated by integrating the driving torque $T_{IN}$ from when the accelerator pedal is depressed, has reached the predetermined wheel speed, for example, 15 km/h.

When a negative determination is made in step S9, that is, when it is determined that the vehicle is running on a flat road, the normal engagement force control suitable for running on a flat road is performed by controlling the electric current supplied to the electromagnetic solenoid 36 according to the transmission torque command value $T_{OUT}$ that is calculated based on the torque distribution ratio KST of, for example, 0.2 using the equation (1). Then, the routine is terminated. When an affirmative determination is made in step S9, that is, when it is determined that the vehicle is running on a road having a high running resistance in step S9, the high running resistance road control (sand road running control) suitable for running on a road having a high running resistance, for example, running on a sand road is performed for making the engagement force of the coupling 24 maximum as compared with the normal control, by controlling the electric current supplied to the electromagnetic solenoid 36 according to the transmission torque command value $T_{OUT}$ calculated based on the torque distribution ratio KST of, for example, 1.0, using the equation (1) in step S10. Then, the routine is terminated. The aforementioned step S10 to S12 correspond to the coupling engagement force control means 80. As a result, in the case where the vehicle is running on a road having a high running resistance, it can be determined that the vehicle is running on a road having a high running resistance even when the wheel speed V is zero. Thus, when the wheels 30 start moving, the distribution of the driving torque to the front wheels and the rear wheels has already become suitable for running on a road having a high running resistance. Therefore, as compared to the case where it is determined that the vehicle is running on a road having a high running resistance after the wheels 30 start moving, it becomes easier to take off or run on a road having a high running resistance, for example, to move out of a sand road, or to run on the sand road. Accordingly, stable running through performance can be obtained. Also, in the case where the vehicle is running on a road having a high running resistance, since the wheel speed continues to be relatively low, that is, approximately 20 km/h to 30 km/h, and the transmission torque transmitted by the coupling 24 continues to be relatively high for a long time, heat loss is likely to occur due to heat generation in the coupling 24. However, by increasing the engagement force of the coupling or making the engagement force maximum, the difference between the rotational speeds of the frictional elements included in the coupling 24 can be decreased as much as possible, and heat generation can be suppressed. That is, it is possible to suitably prevent occurrence of heat loss when the vehicle is running on a road having a high running resistance.

As described above, according to the embodiment, there is provided the wheel speed detection means 64 (vehicle information reading means 63, step S1) for detecting the wheel speed V based on the pulse signal corresponding to the rotational speed of the wheel 30, and the vehicle running state is controlled according to the vehicle running situation that is determined based on the detected wheel speed V. The driving torque integration means 69 (step S3) calculates the integral value $\int T_{IN}dt$ of the driving torque $T_{IN}$ generated by the engine 12, and the running situation determination means 78 (step S9) determines the vehicle running situation based on the actual wheel speed V and the integral value $\int T_{IN}dt$ of the driving torque $T_{IN}$. That is, the running situation determination means 78 appropriately determines the vehicle running situation by comparing the actual wheel speed V which varies according to the vehicle running situation, and the function f ($\int T_{IN}dt$) even when the actual wheel speed is in the extremely low speed region. The function f ($\int T_{IN}dt$) is the function of the integral value $\int T_{IN}dt$ of the driving torque $T_{IN}$, and is also the function of the estimated wheel speed $V_P$ that is estimated based on the integral value $\int T_{IN}dt$ of the driving torque $T_{IN}$.

Also, according to the embodiment, since the driving torque integration means 69 (step S3) calculates the integral value $\int T_{IN}dt$ of the driving torque $T_{IN}$ based on the value of output required of the engine 12, the integral value $\int T_{IN}dt$ of the driving torque $T_{IN}$ can be calculated easily. For example, the driving torque integration means 69 calculates the integral value $\int T_{IN}dt$ of the driving torque $T_{IN}$ which is calculated based on the value of required output as a controlled variable that is generally used for controlling the output of the engine 12, such as the fuel injection amount $F_{EFI}$, the intake air amount $Q_{AIR}$, or the throttle valve opening amount $\theta_{TH}$. Alternatively, the driving torque integration means 69 calculates the integral value $\int T_{IN}dt$ of the driving torque $T_{IN}$ based on the integral value of the fuel injection amount $F_{EFI}$, the intake air amount $Q_{AIR}$, the throttle valve opening amount $\theta_{TH}$, or the like.

Also, according to the embodiment, the running situation determination means 78 (step S9) determines the vehicle running situation based on the actual wheel speed V and the integral value $\int T_{IN}dt$ of the driving torque $T_{IN}$, according to the map stored in advance (FIG. 8), which includes a line for distinguishing between different vehicle running situations, and which uses the wheel speed V and the integral value $\int T_{IN}dt$ of the driving torque $T_{IN}$ as parameters. Therefore, the vehicle running situation can be appropriately determined even when the actual wheel speed is in the extremely low speed region.

Also, according to the embodiment, the running situation determination means 78 (step S9) determines the vehicle running situation when the integral value $\int T_{IN}dt$ obtained by integrating the driving torque $T_{IN}$ from when the accelerator pedal is depressed has reached the predetermined value, that is, when the estimated wheel speed $V_P$ estimated based on the integral value $\int T_{IN}dt$ obtained by integrating the driving torque $T_{IN}$ from when the accelerator pedal is depressed has reached the predetermined wheel speed. Therefore, the vehicle running situation can be determined even when the actual wheel speed is zero.

Also, according to the embodiment, there is provided the coupling 24 for controlling the distribution ratio at which the driving torque $T_{IN}$ is distributed to the front wheel 20 and the rear wheel 30 among plural wheels. The coupling engagement force control means 80 controls the engagement force of the coupling 24 according to the vehicle running situation determined by the running situation determination means 78 (step S9). Therefore, when the vehicle is running on a road having a relatively high running resistance, for example, when the vehicle is running on a sand road, the engagement force of the coupling 24 is increased or is made maximum, whereby the difference between the rotational speeds of the frictional elements included in the coupling 24 can be decreased as much as possible, and therefore heat generation can be suppressed. That is, when the vehicle is running on a road having a high running resistance, for example, when the vehicle is running on a sand road, occurrence of heat loss can be suitably prevented. Further, even when the actual wheel speed is in the extremely low speed region, for example, even when the wheels have not started moving, that is, even when the wheel speed is zero, the vehicle can be brought into the four-wheel-drive state suitable for running on a road having a high running resistance, in order to take off, or to run on a road having a high running resistance, for example, to move out of a sand road or to run on the sand road. Accordingly, the driving force can be appropriately distributed to the front wheels and the rear wheels, and stable running through performance can be obtained.

Also, according to the embodiment, the coupling 24 is a coupling for distributing the driving force, which is provided in series with a power transmission path extending from the driving force source to one of the front wheel 20 and the rear wheel 30 in a four-wheel-drive vehicle. With the configuration, it is possible to provide the drive train having low fuel consumption and excellent traction performance.

The embodiment of the invention has been described in detail with reference to the accompanying drawings. However, the invention can be realized in other embodiments.

For example, in the aforementioned embodiment, the invention is applied to the electromagnetic coupling 24 for distributing the driving force as the frictional engagement device. However, the invention is not limited to this coupling 24. For example, the invention may be applied to a hydraulic coupling. In this case, for example, the coupling engagement force control means 80 controls the transmission torque of the hydraulic coupling by controlling the electric current supplied to a linear solenoid valve provided in a hydraulic control circuit which supplies pressure of hydraulic fluid to the hydraulic coupling. Also, a magnetic particle coupling may be employed, in which binding force of magnetic particles that decides the transmission torque is controlled by electromagnetic force.

Also, in the flowchart explaining the coupling engagement force control operation shown in FIG. 10 according to the aforementioned embodiment, when at least steps S1, S2, S3, S9 are performed, the vehicle running situation is determined. In step S10 or step S12, the engagement force of the coupling 24 is controlled according to the vehicle running situation that is determined. That is, if steps S4, S5, S6, S7, S8, and S11 in which the control operation for determining the durability of the coupling is performed are omitted, the invention can be realized. In the case where only the vehicle running situation is determined, the wheel speed sensor 54 does not necessarily need to be provided in the rear wheel, and may be provided at least one of the front wheels 20.

Also, the coupling 24 in the aforementioned embodiment is provided on the differential gear unit for rear wheels 26 side. However, if the coupling 24 is provided on the differential gear unit for front wheels 16 side, the invention can be realized. That is, the vehicle according to the aforementioned embodiment is a front and rear wheel drive vehicle based on a front engine front wheel drive vehicle. However, the invention is not limited to the vehicle, and a front and rear wheel drive vehicle based on a front engine rear drive vehicle may be employed. In this case, the paired rear wheels 30 are main driving wheels, and the paired front wheels 20 are sub-driving wheels. Also, the transmission 14 in the aforementioned embodiment is a manual transmission. However, an automatic transmission may be employed. That is, it is possible to employ a stepped automatic transmission such as a planetary gear type transmission in which plural shift speeds are achieved by combining operations of engagement devices such as a clutch or a brake, or a continuously variable transmission in which the gear ratio is continuously changed.

Also, in the aforementioned embodiment, the engine 12 is used as the driving force source. However, an electric rotating machine which functions as a motor at least during power running may be used. Also, the embodiment can be applied to a hybrid vehicle including the engine 12 and an electric rotating machine.

The running situation determination means 78 in the aforementioned embodiment determines whether the vehicle is running on a road having a high running resistance. However, it may be determined whether the vehicle is running on a low-mu road having a small running resistance as compared to a flat road. In the case where the vehicle is running on a low-mu road, the wheel speed V with respect to the integral value $\int T_{IN}dt$ of the driving torque $T_{IN}$ is high, as compared to the case where the vehicle is running on a flat road. Therefore, for example, the inclination of a region corresponding to running on a low-mu road is large, as compared to the inclination of a region corresponding to running on a flat road in FIG. 8. Accordingly, the function $f(\int T_{IN}dt)$ may be set so that the regions are distinguished from each other.

Also, in the aforementioned embodiment, the driving torque $T_{IN}$ is uniquely decided by the engine torque $T_E$. However, since the gear ratio $\gamma$ is already known, only the engine torque $T_E$ may be used as a substitute value instead of the driving torque $T_{IN}$.

While the invention has been described with reference to exemplary embodiments thereof, it is to be understood that the invention is not limited to the exemplary embodiments or constructions. The invention can be realized in embodiments in which various changes and modifications are made based on knowledge of persons skilled in the art.

The invention claimed is:

1. A vehicle running control apparatus comprising:
    a wheel speed detector that detects a wheel speed based on a pulse signal corresponding to a rotational speed of a wheel;
    a driving torque integration device that calculates an integral value of driving torque generated by a driving force source, the driving torque being integrated by time;

a running situation determination device that determines a vehicle running situation based on the wheel speed and the integral value of the driving torque; and a controller that controls a vehicle running state according to the determined vehicle running situation.

2. The vehicle running control apparatus according to claim 1, wherein the driving torque integration device calculates the integral value of the driving torque based on a value of output required of the driving force source.

3. The vehicle running control apparatus according to claim 1, wherein the running situation determination device determines the vehicle running situation based on an actual wheel speed and the integral value of the driving torque, according to a map stored in advance, which includes a border line for distinguishing between different vehicle running situations, and which uses the wheel speed and the integral value of the driving torque as parameters.

4. The vehicle running control apparatus according to claim 1, wherein the running situation determination device determines the vehicle running situation when the integral value of the driving torque has reached a predetermined value.

5. The vehicle running control apparatus according to claim 1, further comprising:

a frictional engagement device that controls a distribution ratio at which the driving torque is distributed to a front wheel and a rear wheel among plural wheels; and an engagement force control device that controls engagement force of the frictional engagement device according to a result of a determination on the vehicle running situation that is made by the running situation determination device.

6. The vehicle running control apparatus according to claim 5, wherein the frictional engagement device is a coupling for distributing the driving force, which is provided in series with a power transmission path extending from the driving force source to one of the front wheels and the rear wheels in a four-wheel-drive vehicle.

7. A vehicle running control method comprising:

detecting a wheel speed based on a pulse signal corresponding to a rotational speed of a wheel;

calculating an integral value of driving torque generated by a driving force source, the driving torque being integrated by time;

determining the vehicle running situation based on the wheel speed and the integral value of the driving torque; and controlling a vehicle running state according to the determined vehicle running situation.

8. The vehicle running control method according to claim 7, wherein the integral value of the driving torque is calculated on the basis of a value of output required of the driving force source.

9. The vehicle running control method according to claim 7, wherein the vehicle running situation is determined on the basis of an actual wheel speed and the integral value of the driving torque, according to a map stored in advance, which includes a border line for distinguishing between different vehicle running situations, and which uses the wheel speed and the integral value of the driving torque as parameters.

10. The vehicle running control method according to claim 7, wherein the vehicle running situation is determined when the integral value of the driving torque has reached a predetermined value.

11. A vehicle running control method comprising:

detecting a wheel speed based on a pulse signal corresponding to a rotational speed of a wheel;

calculating an integral value of driving torque generated by a driving force source, the driving torque being integrated by time;

estimating a wheel speed based on the integral value;

determining the vehicle running situation by comparing the detected wheel speed and the integral value when the estimated wheel speed reaches a predetermined value; and controlling a vehicle running state according to the determined vehicle running situation.

12. A vehicle running control apparatus comprising:

a wheel speed detector that detects a wheel speed based on a pulse signal corresponding to a rotational speed of a wheel;

a driving torque integration device that calculates an integral value of driving torque generated by a driving force source, the driving torque being integrated by time;

a running situation determination device that estimates a wheel speed based on the integral value and determines a vehicle running situation by comparing the detected wheel speed and the integral value when the estimated wheel speed reaches a predetermined value; and a controller that controls a vehicle running state according to the determined vehicle running situation.

* * * * *

UNITED STATES PATENT AND TRADEMARK OFFICE
CERTIFICATE OF CORRECTION

PATENT NO. : 7,376,503 B2
APPLICATION NO. : 10/548961
DATED : May 20, 2008
INVENTOR(S) : Toshihiro Suzuki et al.

It is certified that error appears in the above-identified patent and that said Letters Patent is hereby corrected as shown below:

| Column | Line  |                                                                   |
|--------|-------|-------------------------------------------------------------------|
| 8      | 19-20 | Change "gear ratio y" to --gear ratio $\gamma$--.                 |
| 14     | 21    | Change "opening amount 6" to --opening amount $\theta_{TH}$--. |

Signed and Sealed this

Sixteenth Day of June, 2009

JOHN DOLL
*Acting Director of the United States Patent and Trademark Office*